(12) United States Patent
Anzai

(10) Patent No.: US 11,313,165 B2
(45) Date of Patent: Apr. 26, 2022

(54) TERMINAL DEVICE, COMMUNICATION SYSTEM, AND COMMUNICATION METHOD OF TERMINAL DEVICE FOR INTEGRATING AND TRANSMITTING DATA

(71) Applicant: FUJI ELECTRIC CO., LTD., Kanagawa (JP)

(72) Inventor: Fumihiko Anzai, Tokyo (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 160 days.

(21) Appl. No.: 16/699,242

(22) Filed: Nov. 29, 2019

(65) Prior Publication Data

US 2020/0240195 A1    Jul. 30, 2020

(30) Foreign Application Priority Data

Jan. 30, 2019  (JP) .............................. JP2019-014754
Jun. 7, 2019   (JP) .............................. JP2019-107357

(51) Int. Cl.
| | |
|---|---|
| *E05F 15/659* | (2015.01) |
| *H04L 29/08* | (2006.01) |
| *H04L 12/933* | (2013.01) |
| *H04L 12/931* | (2013.01) |
| *H04L 67/125* | (2022.01) |
| *H04L 49/15* | (2022.01) |
| *H04L 49/351* | (2022.01) |

(52) U.S. Cl.
CPC ............ *E05F 15/659* (2015.01); *H04L 49/15* (2013.01); *H04L 49/351* (2013.01); *H04L 67/125* (2013.01); *E05Y 2900/51* (2013.01)

(58) Field of Classification Search
CPC ...... E05F 15/659; H04L 49/15; H04L 49/351; H04L 67/125; E05Y 2900/51
USPC .......................................................... 709/208
See application file for complete search history.

(56) References Cited

U.S. PATENT DOCUMENTS

| | | | | |
|---|---|---|---|---|
| 6,062,343 A | * | 5/2000 | Wang .................... | B66B 1/3415 187/247 |
| 6,598,108 B1 | * | 7/2003 | Ashida ............... | G05B 19/0421 710/305 |
| 2012/0084400 A1 | * | 4/2012 | Almadi ................... | H04L 67/12 709/219 |

FOREIGN PATENT DOCUMENTS

JP          2001-275211       10/2001

\* cited by examiner

*Primary Examiner* — Sargon N Nano
*Assistant Examiner* — Chong G Kim
(74) *Attorney, Agent, or Firm* — IPUSA, PLLC

(57) ABSTRACT

A terminal device that is connected via a cable to a port of a switching device and performs data communication with a master device includes: a plurality of controllers configured to control, in accordance with a control command transmitted from the master device, a plurality of objects to be controlled; and a data transmitter configured to integrate data, transmitted from the plurality of respective controllers, in a transmission format for transmitting data to the master device to transmit the integrated data to the switching device.

4 Claims, 13 Drawing Sheets

FIG.3

(a) FORMAT (CONNECTED TYPE)

(b) FORMAT (MIXED TYPE)

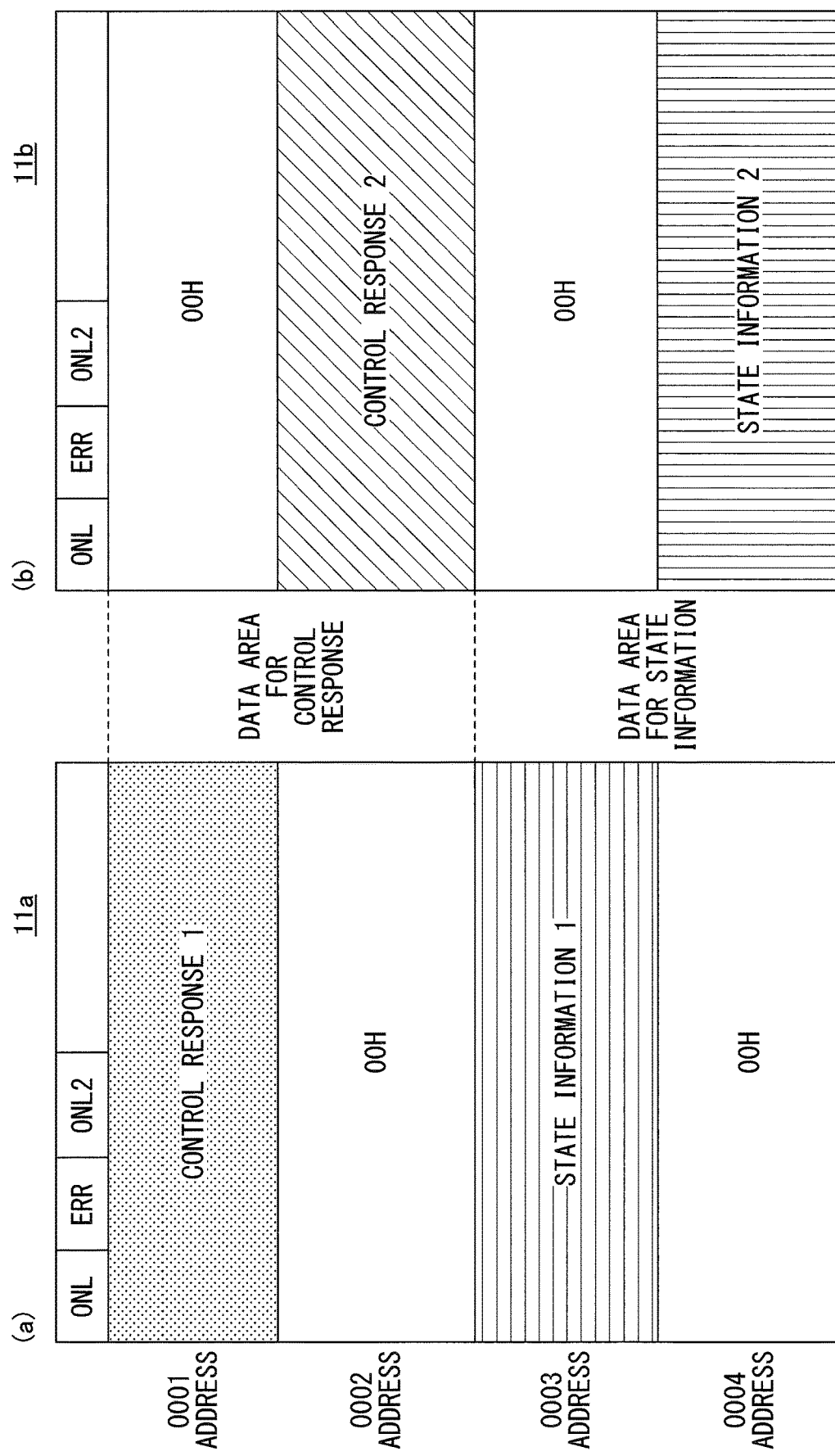

| ADDRESS | ONL | ERR | ONL2 | 000H |
|---|---|---|---|---|
| 0001 | 0H | CONTROL RESPONSE 1 | CONTROL RESPONSE 1 | 0H |
| 0002 | CONTROL RESPONSE 1 | CONTROL RESPONSE 1 | CONTROL RESPONSE 1 | CONTROL RESPONSE 1 |
| 0003 | 0000H | 0000H | 0000H | 0000H |
| 0004 | CONTROL RESPONSE 1 | CONTROL RESPONSE 1 | 0H | CONTROL RESPONSE 1 |
| 0005 | CONTROL RESPONSE 1 | CONTROL RESPONSE 1 | 000H | 000H |
| 0006 | 0H | 0H | 0H | 0H |
| 0007 | 0H | CONTROL RESPONSE 1 | CONTROL RESPONSE 1 | 0H |
| 0008 | 0H | 00H | STATE INFORMATION 1 | STATE INFORMATION 1 |
| 0009 | STATE INFORMATION 1 | STATE INFORMATION 1 | STATE INFORMATION 1 | STATE INFORMATION 1 |
| 0010 | 0000H | 0000H | 0000H | 0000H |
| 0011 | 0H | 0H | STATE INFORMATION 1 | STATE INFORMATION 1 |
| 0012 | 0H | STATE INFORMATION 1 | STATE INFORMATION 1 | STATE INFORMATION 1 |
| 0013 | 0H | 0H | 0H | 0H |
| 0014 | STATE INFORMATION 1 | 000H | 000H | 000H |

DATA AREA FOR CONTROL RESPONSE

DATA AREA FOR STATE INFORMATION

(b) 11b

| ONL | ERR | ONL2 | 000H |
|---|---|---|---|
| 0H | 00H | CONTROL RESPONSE 2 | CONTROL RESPONSE 2 |
| 0000H | 0000H | 0000H | 0000H |
| 0H | CONTROL RESPONSE 2 | CONTROL RESPONSE 2 | CONTROL RESPONSE 2 |
| 0H | CONTROL RESPONSE 2 | 0H | CONTROL RESPONSE 2 |
| 0H | 0H | CONTROL RESPONSE 2 | CONTROL RESPONSE 2 |
| CONTROL RESPONSE 2 | 0H | 0H | 0H |
| STATE INFORMATION 2 | STATE INFORMATION 2 | STATE INFORMATION 2 | 00H |
| 0000H | 0000H | 0000H | 0000H |
| STATE INFORMATION 2 | STATE INFORMATION 2 | STATE INFORMATION 2 | STATE INFORMATION 2 |
| STATE INFORMATION 2 | 0H | 0H | 00H |
| STATE INFORMATION 2 | STATE INFORMATION 2 | 0H | 0H |
| 0H | 0H | STATE INFORMATION 2 | STATE INFORMATION 2 |

FIG.5

| TERMINAL STATUS 1 | | | TERMINAL STATUS 2 | | | TERMINAL STATUS 3 | | | | |
|---|---|---|---|---|---|---|---|---|---|---|
| ONL ONL2 | ERR | STATE | ONL ONL2 | ERR | STATE | ONL | ERR | ONL2 | STATE | ADDITIONAL INFORMATION | NOTE |
| 1 | 0 | NORMAL | 1 | 0 | NORMAL | 1 | 0 | 1 | NORMAL | ALL NORMAL | FUNCTIONS OF BOTH TERMINALS ARE AVAILABLE |
| 1 | 0 | NORMAL | 1 | 1 | MINOR FAILURE | 1 | 1 | 1 | MINOR FAILURE | *1 | FUNCTIONS OF BOTH TERMINALS ARE AVAILABLE |
| 1 | 0 | NORMAL | 0 | 1 | SERIOUS FAILURE | 1 | 1 | 0 | MINOR FAILURE | *2 | FUNCTIONS OF TERMINAL 1 SIDE ARE AVAILABLE |
| 1 | 0 | NORMAL | 0 | 0 | OTHER | 1 | 0 | 0 | NORMAL | *3 | FUNCTIONS OF TERMINAL 1 SIDE ARE AVAILABLE |
| 1 | 1 | MINOR FAILURE | 1 | 0 | NORMAL | 1 | 1 | 1 | MINOR FAILURE | *1 | FUNCTIONS OF BOTH TERMINALS ARE AVAILABLE |
| 1 | 1 | MINOR FAILURE | 1 | 1 | MINOR FAILURE | 1 | 1 | 1 | MINOR FAILURE | *1 | FUNCTIONS OF BOTH TERMINALS ARE AVAILABLE |
| 1 | 1 | MINOR FAILURE | 0 | 1 | SERIOUS FAILURE | 1 | 1 | 0 | MINOR FAILURE | *2 | FUNCTIONS OF TERMINAL 1 SIDE ARE AVAILABLE |
| 1 | 1 | MINOR FAILURE | 0 | 0 | OTHER | 1 | 1 | 0 | MINOR FAILURE | *2 | FUNCTIONS OF TERMINAL 1 SIDE ARE AVAILABLE |
| 0 | 1 | SERIOUS FAILURE | 1 | 0 | NORMAL | 1 | 1 | 0 | MINOR FAILURE | *2 | FUNCTIONS OF TERMINAL 2 SIDE ARE AVAILABLE |
| 0 | 1 | SERIOUS FAILURE | 1 | 1 | MINOR FAILURE | 1 | 1 | 0 | MINOR FAILURE | *2 | FUNCTIONS OF TERMINAL 2 SIDE ARE AVAILABLE |
| 0 | 1 | SERIOUS FAILURE | 0 | 1 | SERIOUS FAILURE | 0 | 1 | 0 | SERIOUS FAILURE | *4 | FUNCTIONS OF BOTH TERMINALS ARE UNAVAILABLE |
| 0 | 1 | SERIOUS FAILURE | 0 | 0 | OTHER | 0 | 1 | 0 | SERIOUS FAILURE | *4 | FUNCTIONS OF BOTH TERMINALS ARE UNAVAILABLE |
| 0 | 0 | OTHER | 1 | 0 | NORMAL | 1 | 0 | 0 | NORMAL | *3 | FUNCTIONS OF TERMINAL 2 SIDE ARE AVAILABLE |
| 0 | 0 | OTHER | 1 | 1 | MINOR FAILURE | 1 | 1 | 0 | MINOR FAILURE | *2 | FUNCTIONS OF TERMINAL 2 SIDE ARE AVAILABLE |
| 0 | 0 | OTHER | 0 | 1 | SERIOUS FAILURE | 0 | 1 | 0 | SERIOUS FAILURE | *4 | FUNCTIONS OF BOTH TERMINALS ARE UNAVAILABLE |
| 0 | 0 | OTHER | 0 | 0 | OTHER | 0 | 0 | 0 | OTHER | ALL OTHER | FUNCTIONS OF BOTH TERMINALS ARE UNAVAILABLE |

FIG.11A

| ONL | ERR | 000H |
|---|---|---|
| CONTROL RESPONSE 1 ||| 
| STATE INFORMATION 1 |||

FIG.11B

| ONL | ERR | 000H |
|---|---|---|
| CONTROL RESPONSE 2 |||
| STATE INFORMATION 2 |||

TERMINAL DEVICE, COMMUNICATION SYSTEM, AND COMMUNICATION METHOD OF TERMINAL DEVICE FOR INTEGRATING AND TRANSMITTING DATA

CROSS-REFERENCE TO RELATED APPLICATION

The present application is based on and claims priority to Japanese Priority Application No. 2019-014754 filed on Jan. 30, 2019, and Japanese Priority Application No. 2019-107357 filed on Jun. 7, 2019, the entire contents of which are hereby incorporated by reference.

BACKGROUND OF THE INVENTION

1. Field of the Invention

The present invention relates to a terminal device, a communication system, and a communication method of a terminal device.

2. Description of the Related Art

Patent Document 1 discloses a communication system (vehicle information device) that achieves, by reducing delay in information transmission time, real-time control and enables a control function between vehicles for enhancing vehicle performance. In this type of a communication system, in a case where a network is Ethernet (registered trade mark), because a one-to-one connection is required between terminal devices and Ethernet switches, the number of Ethernet switch ports needs to be greater than or equal to than the number of terminal devices.

RELATED-ART DOCUMENTS

[Patent Document]
[Patent Document 1] Japanese Laid-open Patent Publication No. 2001-275211

However, in a case where the communication system disclosed in Patent Document 1 is used for a communication system of a train, for example, one terminal device is connected to one port of an Ethernet switch. Therefore, there is a problem that when the number of terminal devices exceeds the number of ports of an Ethernet switch, it is required to add an Ethernet switch.

In view of the above, one aspect of the present invention has an object to provide a terminal device that can suppress an increase in the number of Ethernet switches.

SUMMARY OF THE INVENTION

In view of the above, according to one aspect of the present invention, a terminal device that is connected via a cable to a port of a switching device and performs data communication with a master device includes: a plurality of controllers configured to control, in accordance with a control command transmitted from the master device, a plurality of devices to be controlled; and a data transmitter configured to integrate data, transmitted from the plurality of respective controllers, in a transmission format for transmitting data to the master device to transmit the integrated data to the switching device.

According to one aspect of the present invention, it is possible to suppress an increase in the number of Ethernet switches.

BRIEF DESCRIPTION OF THE DRAWINGS

FIG. 3 is a diagram illustrating an example of transmission formats of data from a communication I/F to a communication master;

FIG. 4A is a diagram illustrating an example of transmission formats of data from CPUs to the communication I/F;

FIG. 4B is a diagram illustrating an example of transmission formats of data from CPUs to the communication I/F;

FIG. 5 is a diagram that describes a state of the terminal device;

FIG. 11A is a diagram illustrating an example of a transmission format of data from a CPU to a communication I/F included in a terminal device illustrated in FIG. 9;

FIG. 11B is a diagram illustrating an example of a transmission format of data from a CPU to a communication I/F included in a terminal device illustrated in FIG. 9.

DETAILED DESCRIPTION OF THE EMBODIMENTS

In the following, a terminal device, a communication system, and a communication method of a terminal device according to an embodiment of the present invention will be described in detail with reference to the drawings. Note that the present invention is not limited to the following embodiment.

[Embodiment]

Figure 1:
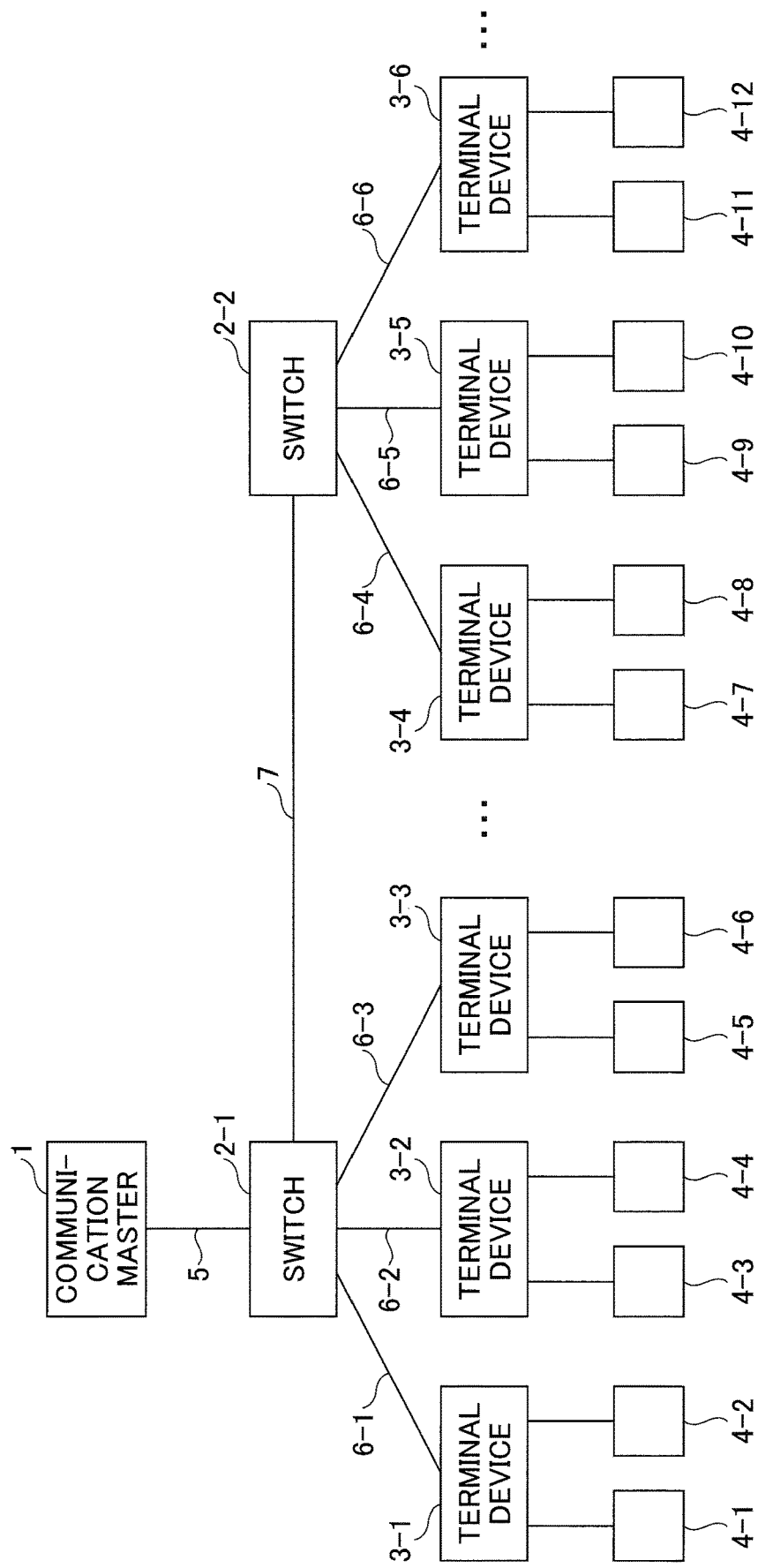
FIG. 1 is a diagram illustrating a configuration example of a communication system according to an embodiment of the present invention.

FIG. 1 is a diagram illustrating a configuration example of a communication system 100 according to an embodiment of the present invention. The communication system 100 according to the embodiment of the present invention includes a communication master 1 (which is a master device) and a plurality of switches 2-1 and 2-2 that are Ethernet switches (which are switching devices) connected to the communication master 1 via an Ethernet cable 5.

The communication system 100 also includes a plurality of terminal devices 3-1 to 3-3, which are connected to the switch 2-1 via Ethernet cables 6-1 to 6-3, and a plurality of terminal devices 3-4 to 3-6, which are connected to the switch 2-2 via Ethernet cables 6-4 to 6-6.

The communication master 1 and the switch 2-1 are communicatively connected to each other via the Ethernet cable 5. The switch 2-1 and the switch 2-2 are communicatively connected to each other via the Ethernet cable 7. The switch 2-1 and the terminal devices 3-1 to 3-3 are communicatively connected to each other via the Ethernet cables 6-1 to 6-3. The switch 2-2 and the terminal devices 3-4 to 3-6 are communicatively connected to each other manner via the Ethernet cables 6-4 to 6-6.

A plurality of objects 4-1 and 4-2 to be controlled are connected to the terminal device 3-1. A plurality of objects 4-3 and 4-4 to be controlled are connected to the terminal device 3-2. A plurality of objects 4-5 and 4-6 to be controlled are connected to the terminal device 3-3. A plurality of objects 4-7 and 4-8 to be controlled are connected to the terminal device 3-4. A plurality of objects 4-9 and 4-10 to be controlled are connected to the terminal device 3-5. A plurality of objects 4-11 and 4-12 to be controlled are connected to the terminal device 3-6.

In the following, each of the plurality of switches 2-1 and 2-2 may be referred to as the "switch 2" unless otherwise distinguished. In addition, each of the plurality of terminal devices 3-1 to 3-6 may be referred to as the "terminal device 3" unless otherwise distinguished. In addition, each of the plurality of objects 4-1 to 4-12 to be controlled may be referred to as the "object 4 to be controlled (device to be controlled)" unless otherwise distinguished. In addition, each of the Ethernet cables 6-1 to 6-6 may be referred to as the "Ethernet cable 6" unless otherwise distinguished.

Note that the number of terminal devices 3 that are connected to the switch 2-1 may be two or more, and is not limited to three. Further, the number of terminal devices 3 that are connected to the switch 2-2 may be two or more, and is not limited to three.

The object 4 to be controlled is, for example, a door control device that is provided in a railway vehicle (train car). A door control device is, for example, a control device that individually controls doors that open in left and right directions and that are provided in one door opening portion among a plurality of doors provided in one railway vehicle. According to one door control device, it is possible to control opening and closing of one of doors that open in left and right directions and that are provided in one door opening portion. For example, in a case where one railway vehicle has six entrances each of has doors that open in left and right directions, the number of door control devices is twelve.

The communication system 100 is, for example, a data communication system within a train in which a plurality of cars are connected. Most of the data transmission systems of this type perform master-slave type communication, exchange data with a plurality of terminal devices 3 in which the communication master 1 is a slave, and collect state information. The state information indicates the state (such as an event occurrence situation, an internal signal state, or statistics) of the terminal device 3. The terminal status is transmitted as state data representing each state of the CPU 11-1 and the CPU 11-2, which will be described later. Also, with respect to data from the communication master 1 to the plurality of terminal devices 3, in consideration of the transmission efficiency and the synchronization, data to the plurality of terminal devices 3 are collected together and then transmitted together in a one-to-many multicast. Note that data (such as control response and state information) may be transmitted individually from the terminal devices 3 to the communication master 1.

Figure 2:
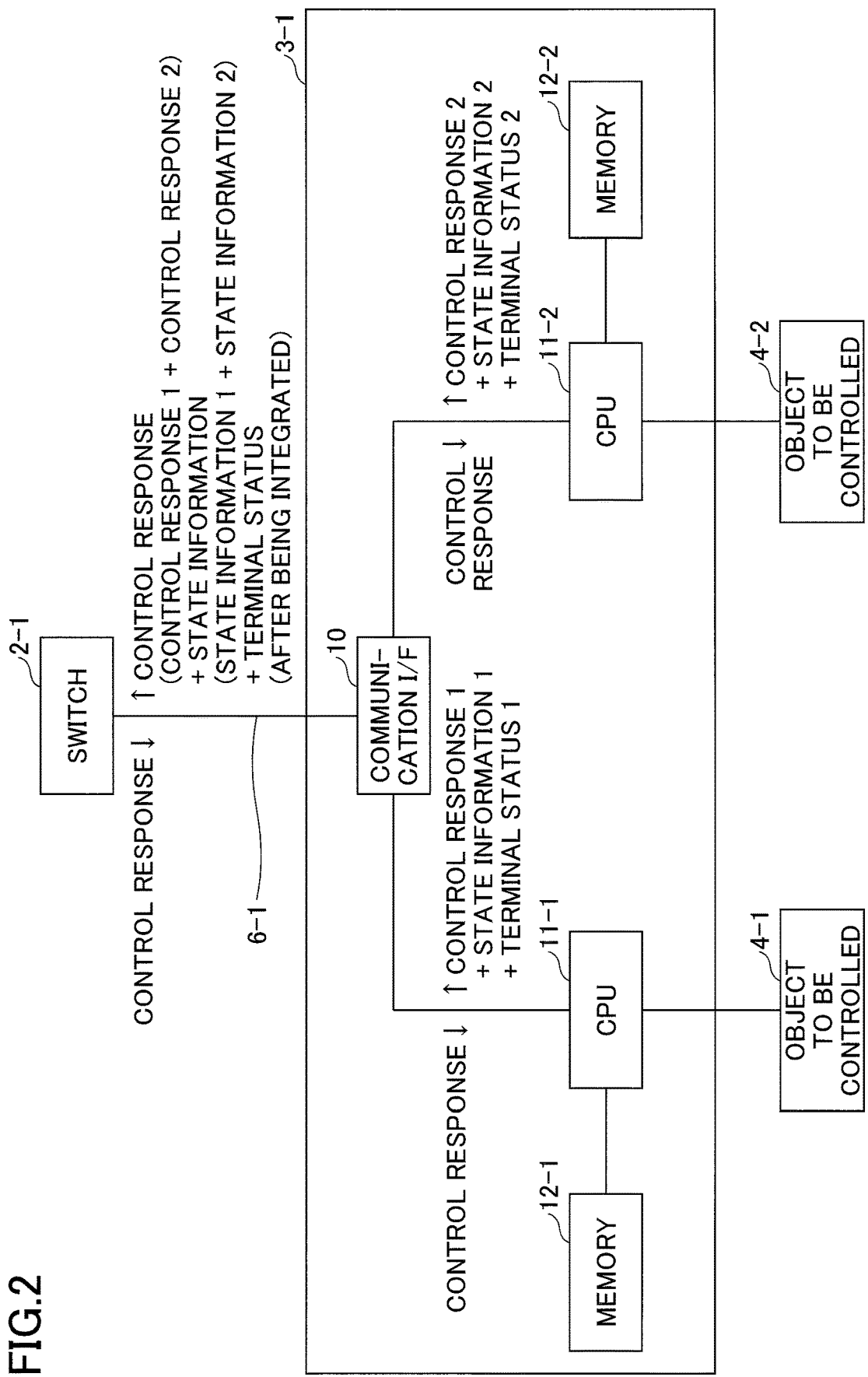
FIG. 2 is a diagram illustrating an internal configuration example of a terminal device that is illustrated in FIG. 1.

FIG. 2 is a diagram illustrating an internal configuration example of the terminal device 3-1 that is illustrated in FIG. 1. FIG. 2 illustrates a configuration example in which two door control devices are connected to the switch 2-1 via one Ethernet cable 6-1.

The terminal device 3-1 includes a communication I/F 10 (which serves as a data transmitter), a CPU 11-1 (which serves as a controller), a memory 12-1, a CPU 11-2 (which serves as a controller), and a memory 12-2.

One object 4-1 to be controlled is connected to the CPU 11-1. One object 4-2 to be controlled is connected to the CPU 11-2. Note that because each of the terminal devices 3-2 to 3-6 illustrated in FIG. 1 has a configuration similar to that of the terminal device 3-1, the description of the terminal devices 3-2 to 3-6 will be omitted below. In addition, although two objects 4 to be controlled are connected to the terminal device 3-1, the number of objects 4 to be controlled and connected to the terminal device 3-1 is not limited to two, but may be one or three or more.

A "control command" output from the communication master 1 illustrated in FIG. 1 is received via the switch 2-1, the Ethernet cable 6-1, and the communication I/F 10 by the CPU 11-1 and the CPU 11-2. Data that is transmitted from the CPU 11-1 to the communication I/F 10 is "control response 1+state information 1+terminal status 1". Data that is transmitted from the CPU 11-2 to the communication I/F 10 is "control response 2+state information 2+terminal status 2". These data are integrated in the communication I/F 10 and the integrated data is transmitted to the switch 2-1. The data transmitter, which is the communication I/F 10, arranges data transmitted from each of the CPU 11-1 and CPU 11-2, which are controllers, at positions that do not overlap with each other in a transmission format. Details of transmission formats will be described below. Data that is transmitted from the communication I/F 10 via the switch 2-1 to the communication master 1 illustrated in FIG. 1 is "control response 1+control response 2+state information 1+state information 2+terminal status 1+terminal status 2".

Figure 3:
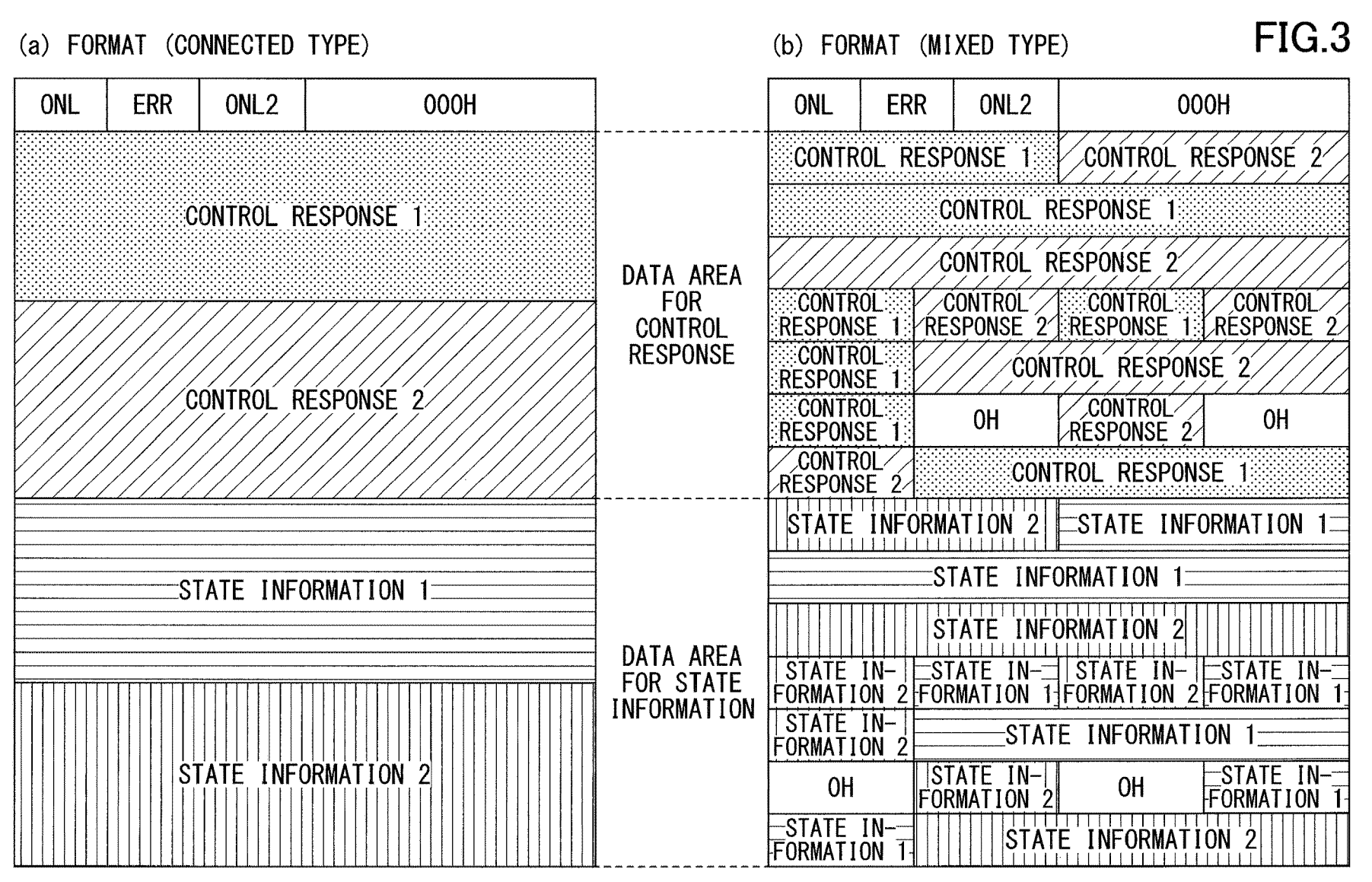

An example of a transmission format of data transmitted to the communication master 1 as described above will be described. FIG. 3 is a diagram illustrating an example of transmission formats of data from the communication I/F 10 to the communication master 1. FIGS. 4A and 4B are diagrams illustrating an example of transmission formats of data from the CPU 11-1 and 11-2 to the communication I/F 10.

Here, (a) of FIG. 3 illustrates an example in which the control response 1, the control response 2, the state information 1, and the state information 2 are transmitted in this order. A transmission format for transmitting the control response 1, the control response 2, the state information 1, and the state information 2 as illustrated in (a) of FIG. 3 is illustrated in FIG. 4A. For "ONL2" illustrated in FIG. 3, a value of logical conjunction of ONL2 of each terminal status is stored. In the transmission format illustrated in FIG. 4A, "ONL" represents online, "ERR" represents an error, and "ONL2" represents a copy of ONL. Also, ONL, ERR, and ONL2 are state data representing states of the respective CPU 11-1 and CPU 11-2.

In (a) FIG. 4A, the control response 1 and the state information 1 are embedded in the transmission format for transmitting data from the CPU 11-1 to the communication I/F 10. For example, the control response 1 is stored in the data area of for control response in the transmission format. The state information 1 is stored in the data area for state information in the transmission format. For "ONL2", a value that is the same in ONL is stored.

In (b) of FIG. 4A, the control response 2 and the state information 2 are embedded in the transmission format for transmitting data from the CPU 11-2 to the communication I/F 10. For example, the control response 2 is stored in a data area for control response in the transmission format. The state information 2 is stored in a data area for state information in the transmission format.

The communication I/F 10 creates the transmission format illustrated in (a) of FIG. 3 by integrating the data from the CPU 11-1 and the data from the CPU 11-2 and transmits the integrated data to the communication master 1. To integrate data means that, before taking a logical disjunction of the data received from the CPU 11-1 and the data received from the CPU 11-2, the communication I/F 10 takes an exclusive logical disjunction (XOR) of the data received from the CPU 11-1 and a logical conjunction pattern and takes an exclusive logical disjunction (XOR) of the data received from the CPU 11-2 and the logical conjunction pattern and then takes a logical disjunction of these value. At the time of integrating terminal statuses, the communication I/F 10 can treat a desired bit to be subject to logical conjunction. Specifically, the communication I/F 10 has a logical conjunction pattern where the bit that is subject to logical conjunction is 1. The logical conjunction pattern is set such that the bit that is subject to logical conjunction is to 1 and the bit(s) that is not subject to logical conjunction is 0. The communication I/F 10 stores, in the transmission format, the result of exclusive logic disjunction of the integrated data and the logical conjunction pattern.

Here, (b) of FIG. 3 illustrates an example in which control responses 1, control responses 2, state information 1, and state information 2 are transmitted in a mixed manner by a method different from the method illustrated in (a) of FIG. 3. A transmission format for transmitting the control responses 1, the control responses 2, the state information 1, and the state information 2 as illustrated in (b) of FIG. 3 is illustrated in FIG. 4B.

In (a) FIG. 4B, the control responses 1 and the state information 1 are embedded in the transmission format for transmitting data from the CPU 11-1 to the communication I/F 10. In (b) of FIG. 4B, the control responses 2 and the state information 2 are embedded in the transmission format for transmitting data from the CPU 11-2 to the communication I/F 10. The communication I/F 10 creates the transmission format illustrated in (b) of FIG. 3 by integrating the data from the CPU 11-1 and the data from the CPU 11-2 and transmits the integrated data to the communication master 1.

The terminal statuses (the terminal status 1 and the terminal status 2) transmitted to the communication master 1 are embedded in areas of "ONL", "ERR", and "ONL2" of the transmission format illustrated in FIG. 4A or FIG. 4B. Also, "ONL" represents online, "ERR" represents an error, and "ONL2" represents a copy of ONL. Also, ONL, ERR, and ONL2 are state data representing states of the respective CPU 11-1 and CPU 11-2.

A specific example of terminal status will be described with reference to FIG. 5. FIG. 5 is a diagram that describes a state of the terminal device 3-1. Here, "*1" indicated in association with additional information represents "minor failure" and represents that "serious failure" or "other" is not present. Also, "*2" represents "minor failure" but represents that "serious failure" or "other" is present. Also, "*3" represents "normal" and represents that "other" is present and "minor failure" or "serious failure" is not present. Also, "*4" represents "serious failure" and represents that "normal" or "minor failure" is not present.

The terminal status 1 represents, for example, a state of the CPU 11-1 and the memory 12-1. The terminal status 2 represents a state of, for example, the CPU 11-2 and the memory 12-2. With regard to control responses and state information described above, the logical disjunctions of the CPU 11-1 and the CPU 11-2 are stored at locations of the other CPU's "0" area (area in which information is not stored) such that original values are stored without change.

With regard to ONL and ERR of the terminal status 3, the logical disjunctions of the respective terminal statuses 1 and 2 of the CPU 11-1 and the CPU 11-2 are stored. With regard to ONL2 of the terminal status 3, the logical conjunction of the respective terminal statuses 1 and 2 of the CPU 11-1 and the CPU 11-2 is stored.

In a case where either the terminal status 1 or the terminal status 2 indicates "normal" or "minor failure", the communication I/F 10 sets the terminal status 3 (terminal status information transmitted to the communication master 1) to be "normal" or "minor failure" because the terminal device 3 has an available function. Here, "normal" corresponds to a case where "ONL" is "1", that is, during on line, and "ERR" is "0". Also, "1" of ONL corresponds to, for example, a state in which the power of the terminal device 3 is powered on and is able to communicate. Also, "minor failure" corresponds to a case where ONL is "1" and ERR is "1". A state in which ERR is "1" is, for example, a case in which although the terminal device 3 is able to operate, the voltage of emergency power supply for driving the terminal device 3 is lower than a certain value.

Also, in a case where both the terminal status 1 and the terminal status 2 indicate "serious failure" or "OTHER", the communication I/F 10 sets the terminal status 3 (terminal status information transmitted to the communication master 1) to be "serious failure" or "OTHER" because the terminal device 3 has no available functions. In a case of "serious failure", a process (such as system fallback) corresponding to that is performed on the communication master 1 side. Also, "serious failure", corresponds to for example, a state in which a motor of the object 4 to be controlled is faulty Also, "other" is a state such as "initializing" other than "normal", "minor failure", and "serious failure". At the time of "other", values of "control response" and "state information" are intermediate and cannot be used by the communication master 1. In a case of "other", because both CPU 11-1 and CPU 11-2 are in a transient state such as "initializing", both "control response" and "state information" are discarded on the communication master 1 side.

Here, in a case where the terminal status 3 is "normal", it can be determined that neither the terminal status 1 nor the terminal status 2 is "minor failure" or "serious failure". However, it cannot be determined by ONL and ERR alone whether either the terminal status 1 or the terminal status 2 is "other" or not. For this reason, when ONL2 is 0, the communication I/F 10 determines that either the terminal status 1 or the terminal status 2 is "other".

Also, in a case where the terminal status 3 is "minor failure", it cannot be determined by ONL and ERR alone whether or not either the terminal status 1 or the terminal status 2 is "serious failure" or "other". For this reason, when ONL2 is 0, the communication I/F 10 determines that either the terminal status 1 or the terminal status 2 is "serious failure" or "other".

Figure 6:
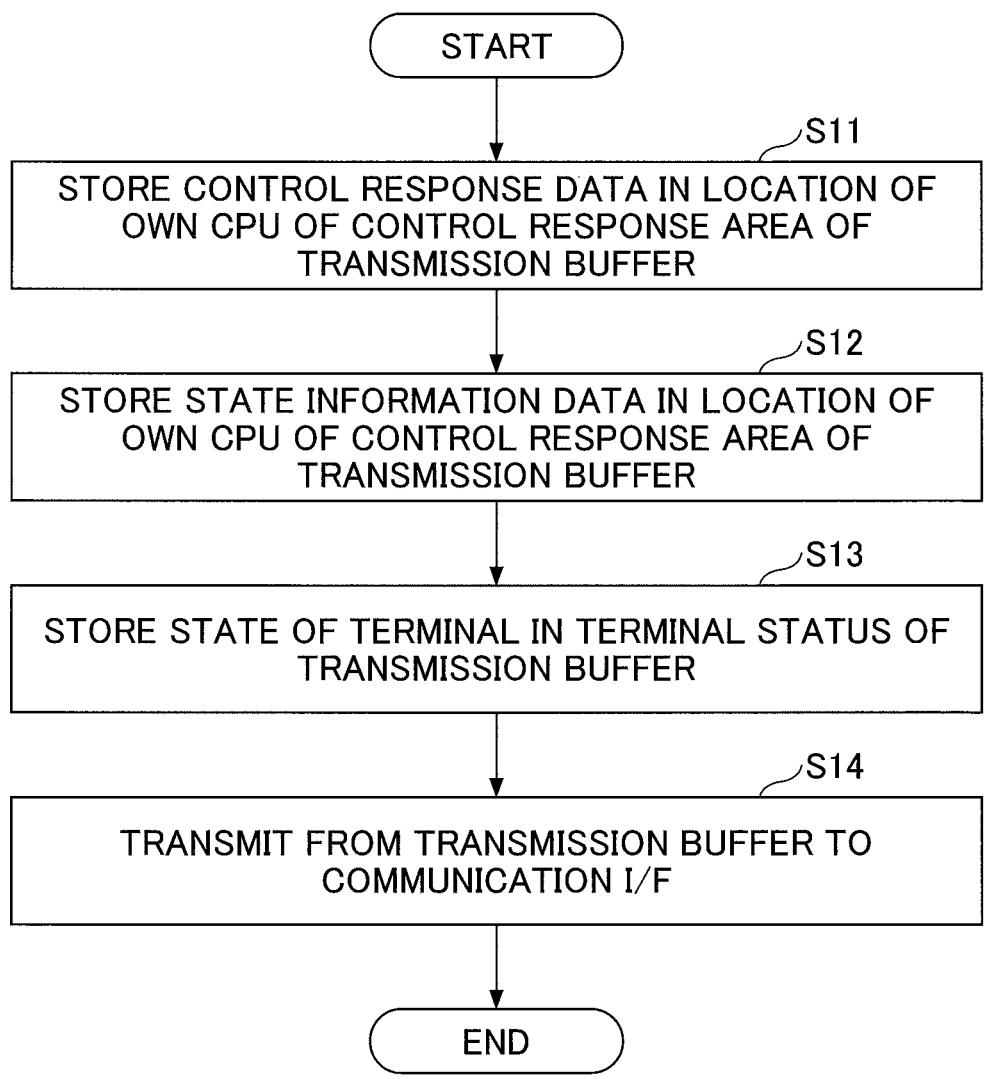
FIG. 6 is a flowchart illustrating a data transmission process from the CPUs and to the communication interface.

Next, a processing operation of data transmission illustrated in FIGS. 3 to 5 will be described. FIG. 6 is a flowchart illustrating a data transmission process from the CPUs 11-1 and 11-2 to the communication interface I/F 10.

In Step S11, the CPU 11-1 stores data of a control response 1 from the object 4-1 to be controlled in a storage area of the CPU 11-1 within the data area for control response of the transmission buffer. Similarly, the CPU 11-2 stores data of a control response 2 from the object 4-2 to be controlled in a storage area of the CPU 11-2 within the data area for control response of the transmission buffer.

In Step S12, the CPU 11-1 stores data of state information 1 from the object 4-1 to be controlled in a storage area of the CPU 11-1 within the data area for state information of the transmission buffer. Similarly, the CPU 11-2 stores data of state information 2 from the object 4-2 to be controlled in a storage area of the CPU 11-2 within the data area for state information of the transmission buffer.

In step S13, the terminal statuses 1 and 2 are each stored in the area for terminal status of the transmission buffer (for example, the area for ONL, ERR, and ONL2 illustrated in FIG. 4).

In step S14, the CPU 11-1 transmits the control response 1, the state information 1, and the terminal status 1 from the transmission buffer to the communication I/F 10. Similarly, the CPU 11-2 transmits the control response 2, the state information 2, and the terminal status 2 from the transmission buffer to the communication I/F 10.

Figure 7:
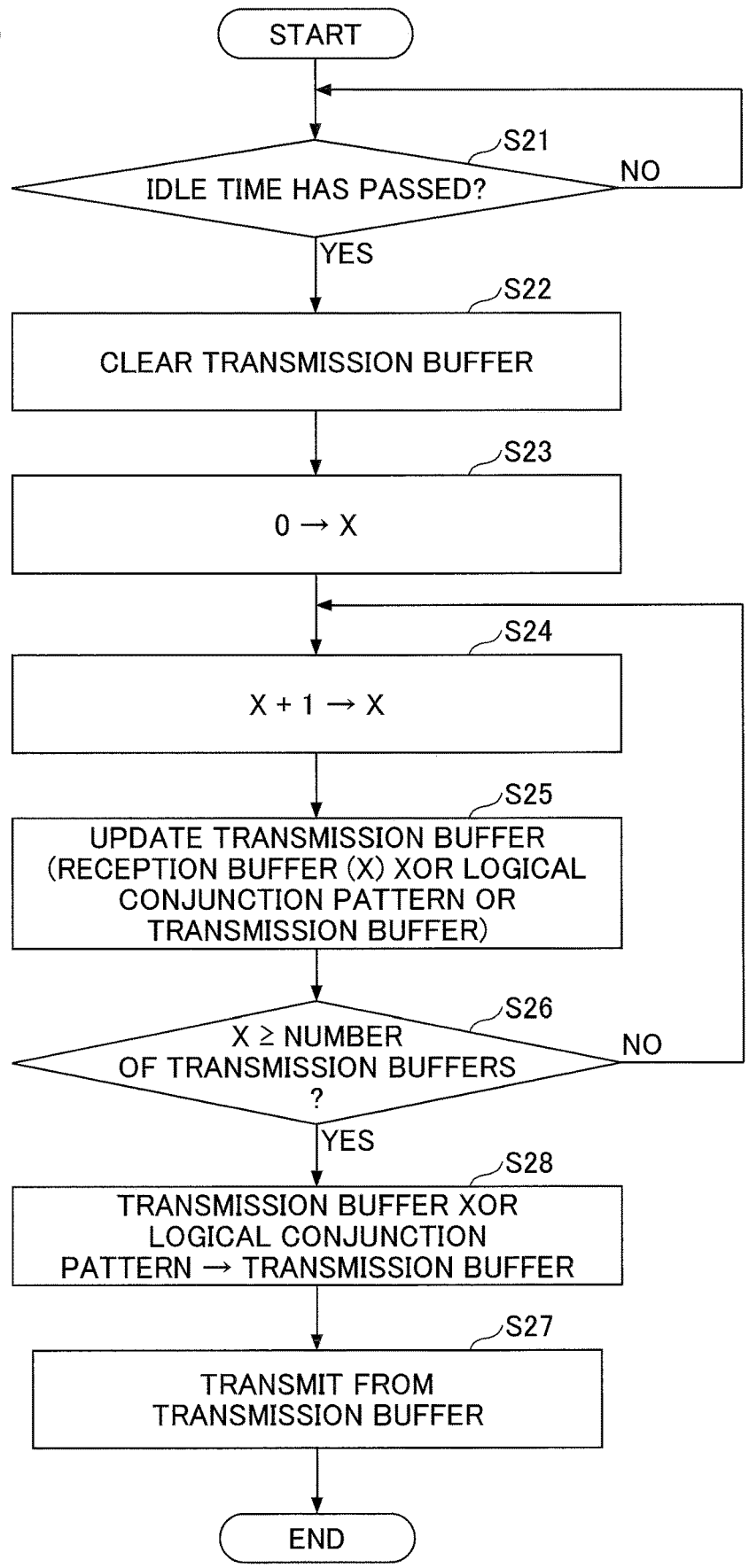
FIG. 7 is a flowchart illustrating a data transmission process from the communication I/F to the communication master.

FIG. 7 is a flowchart illustrating a data transmission process from the communication I/F 10 to the communication master 1.

In step S21, when transmitting received data to the communication master 1, the communication I/F 10 adjusts the transmission timing using an idle time that is set in advance. For example, in a case where data is transmitted from the CPU 11-1 or the CPU 11-2 at constant frequency (at a constant interval), the communication I/F 10 starts counting up a timer when receiving the data from the CPU 11-1 or the CPU 11-2 and determines whether or not the value of the timer has exceeded the idle time that is set in advance. When the value of the timer has not exceeded the idle time (No in Step S21), the communication I/F 10 continues counting up the timer. When the value of the timer has exceeded the idle time (Yes in Step S21), the communication I/F 10 performs processing in Step S22.

In step S22, the communication I/F 10 clears the transmission buffer, and in step S23, the communication I/F 10 updates the value of variable X. In step S24, the communication I/F 10 sets the value of variable X to 1 immediately after the transmission buffer is cleared. In step S27, the communication I/F 10 integrates the received data and then transmits the integrated data to the communication master 1.

In the integration, the communication I/F 10 obtains respective temporary data by exclusive logical disjunction of the data received from the CPU 11-1 and the data received from the CPU 11-2 with a logical conjunction pattern that is set in advance. Then, the communication I/F 10 takes logical disjunction of the obtained respective temporary data in the first cleared transmission buffer for updating. The logical conjunction pattern is such that the bit that is subject to logical conjunction is 1 and the bit(s) that is not subject to logical conjunction is 0. According to the present embodiment, because ONL2 is subject to logical conjunction, to only its position, 1 is set.

With respect to step S26, the number of CPUs 11-1 and 11-2 is set in advance in the communication I/F 10 as the corresponding number to be integrated. While switching the reception buffer containing data for integration, the communication I/F 10 incorporates the data from the CPU 11-1 and the CPU 11-2 into the transmission buffer until the value of variable X is greater than or equal to the number of CPUs. When the value of variable X is less than the number of CPUs (No in step S26), the communication I/F 10 updates the value of variable X by adding 1 to the value of variable X in step S24.

When the value of variable X becomes equal to or more than the number of CPUs (Yes in step S26), incorporation of the data from the CPU 11-1 and the data from the CPU 11-2 into the transmission buffer is completed. Then, the communication I/F 10 takes an exclusive logical disjunction of the data of the transmission buffer with the logical conjunction pattern in step S28. Then, as illustrated in FIG. 3, the data is embedded in the transmission format and the data is transmitted to the communication master 1 in step S27.

Figure 8:
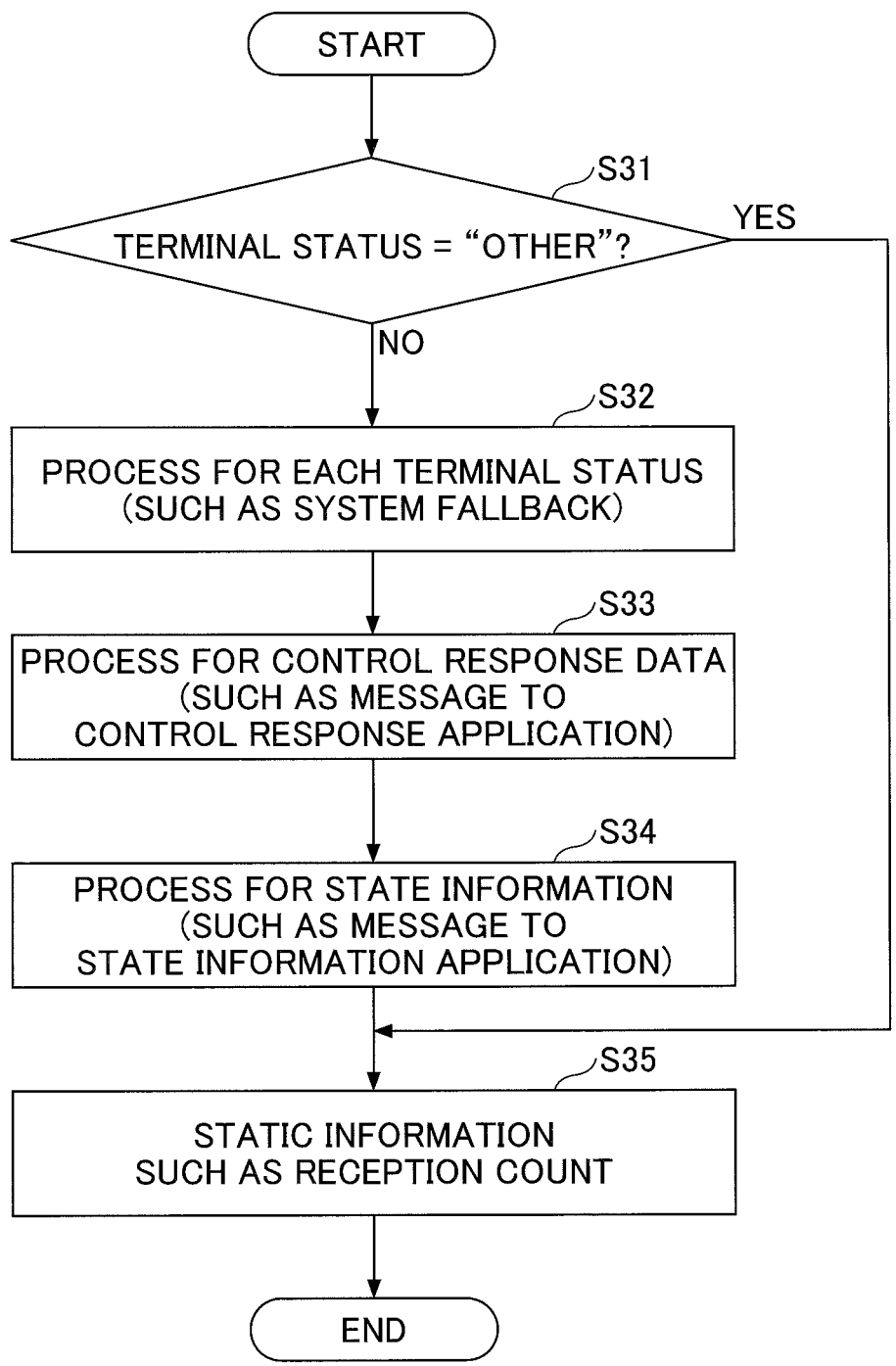
FIG. 8 is a flowchart illustrating a data reception process of the communication master.

FIG. 8 is a flowchart illustrating a data reception process of the communication master 1. When the terminal status is "other" (Yes in step S31), because "control response" and "state information" cannot be used, the communication master 1 does not perform processing of steps S32 to S34, but performs processing of step S35 (statistics information processing such as reception count).

When the terminal status is not "other" (No in step S31), because the terminal status is one of "normal", "minor failure", and "serious failure", the communication master 1 performs, in accordance with the terminal status, processing such as fallback of the system or the like in step S32. At that time, in addition to ONL and ERR, the communication master 1 uses ONL2 as needed.

Next, in order to process control responses, in step S33, the communication master 1 sends data (including the terminal type) with a message to an application for processing control responses. Then, in step S34, in order to process state information, the communication master 1 sends data (including the terminal type) with a message to an application for processing state information. Therefore, in the respective processing applications, respective data are processed according to the terminal type.

In this way, by separating the reception process and the respective processing applications, the reception process is commonly used regardless of the terminal type. In addition, by making separate applications for the processing of control responses and the processing of state information, they can be independently developed or maintained.

Figure 9:
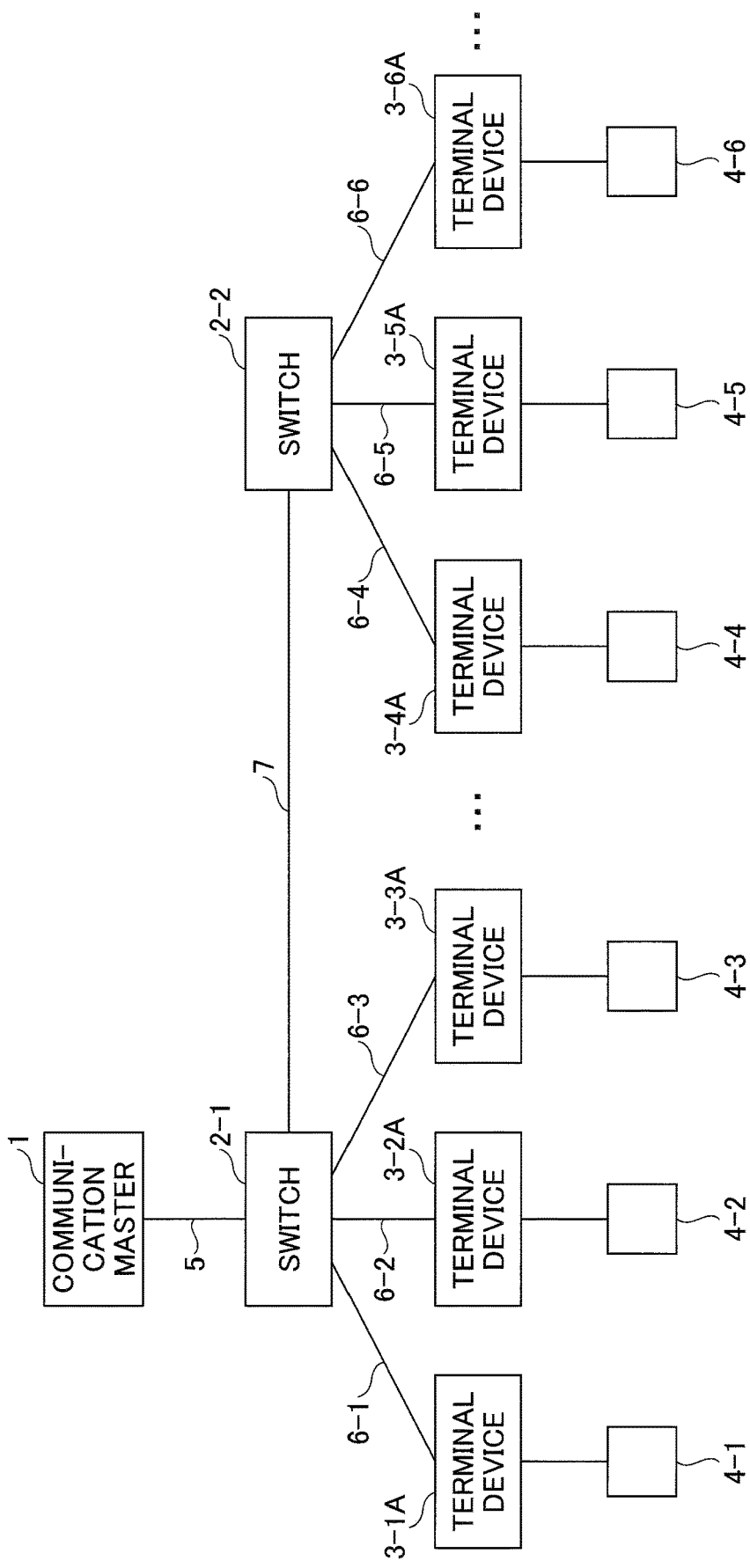
FIG. 9 is a diagram illustrating a configuration example of a comparative example of a communication system with respect to an embodiment of the present invention.
Figure 10:
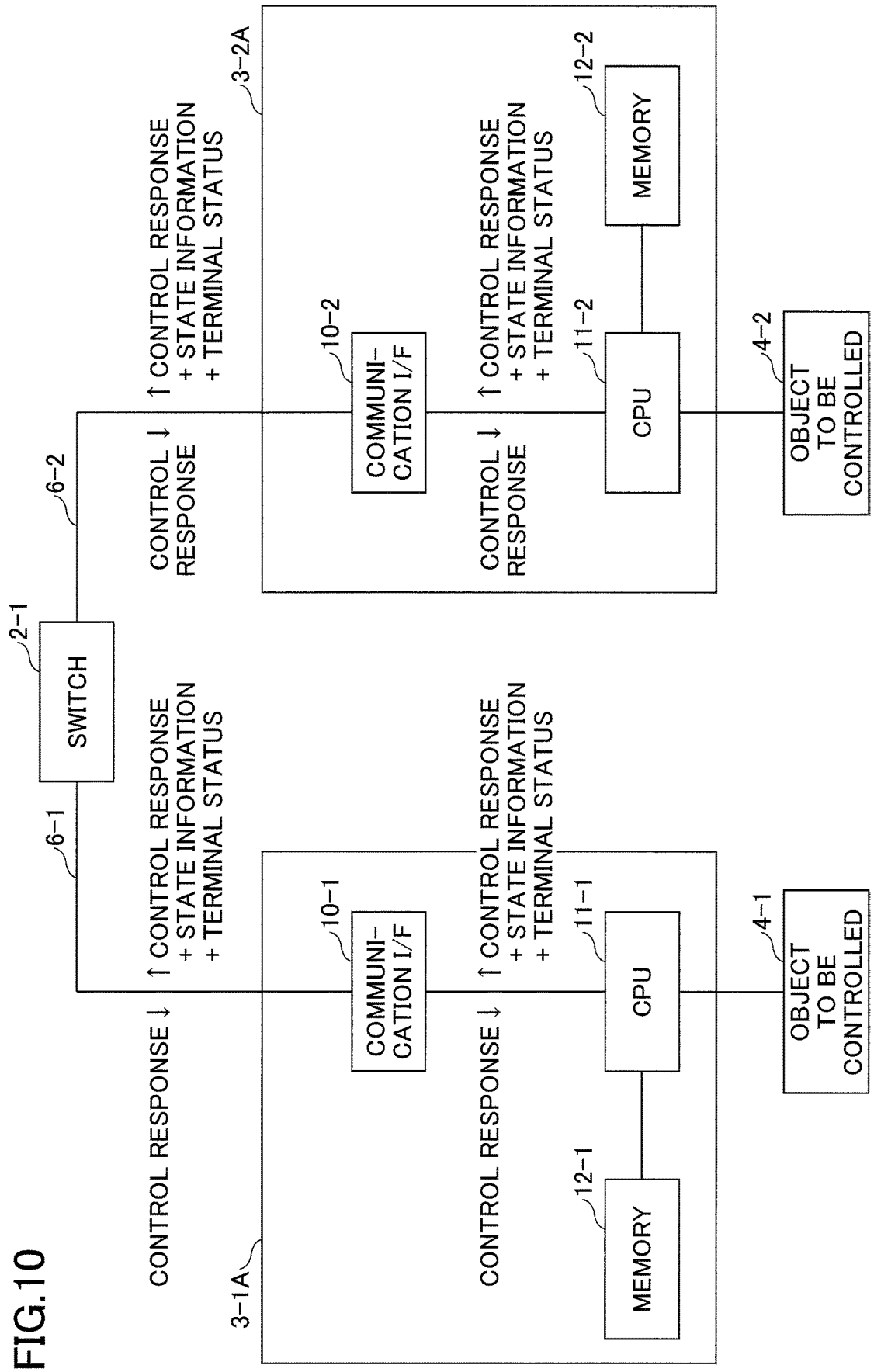
FIG. 10 is a diagram illustrating an internal configuration example of terminal devices that are illustrated in FIG. 9.
Figure 12:
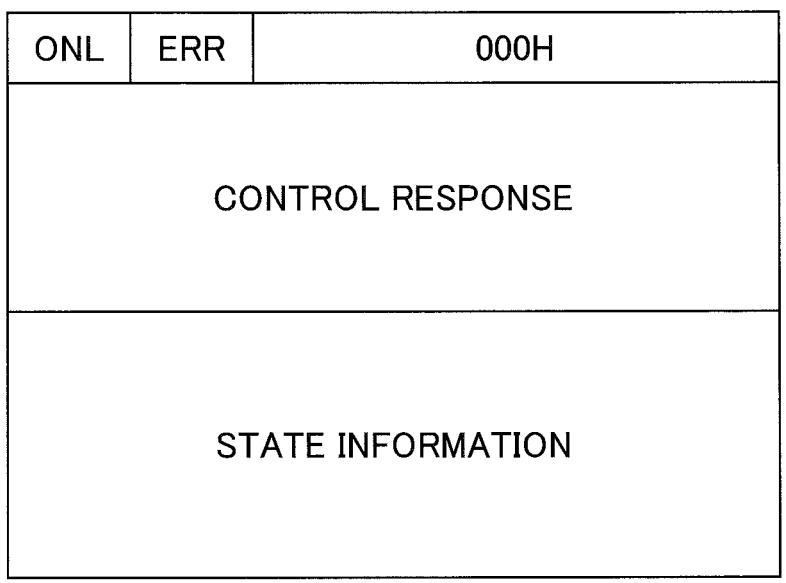
FIG. 12 is a diagram illustrating an example of a transmission format of data from the communication I/F to the communication master.

FIG. 9 is a diagram illustrating a configuration example of a comparative example of a communication system 100A with respect to an embodiment of the present invention. FIG. 10 is a diagram illustrating an internal configuration example of terminal devices 3-1A and 3-2A that are illustrated in FIG. 9. FIGS. 11A and 11B are diagrams illustrating an example of transmission formats of data from the CPUs 11-1 and 11-2 to the communication I/F 10-1 and 10-2. FIG. 12 is a diagram illustrating an example of a transmission format of data from a communication I/F to the communication master 1.

The communication system 100A according to the comparative example illustrated in FIG. 9 includes terminal devices 3-1A to 3-6A instead of the terminal devices 3-1 to 3-6 illustrated in FIG. 1.

An object 4-1 to be controlled is connected to the terminal device 3-1A. An object 4-2 to be controlled is connected to the terminal device 3-2A. An object 4-3 to be controlled is connected to the terminal device 3-3A. An object 4-4 to be controlled is connected to the terminal device 3-4A. An object 4-5 to be controlled is connected to the terminal device 3-5A. An object 4-6 to be controlled is connected to the terminal device 3-6A.

As illustrated in FIG. 10, the terminal device 3-1A includes a communication I/F 10-1, a CPU 11-1, and a memory 12-1. The terminal device 3-2A includes a communication I/F 10-2, a CPU 11-2, and a memory 12-2.

FIG. 11A illustrates an example of a transmission format when data is transmitted from the CPU 11-1 to the communication I/F 10-1. As illustrated in FIG. 11A, the transmission format includes "terminal status" representing the state of the terminal by ONL and ERR, a "control response" that is a response to a control command, and "state information"

representing a state (event occurrence state, internal signal state, statistical information, or the like) of the terminal device 3-1A.

FIG. 11B illustrates an example of a transmission format when data is transmitted from the CPU 11-2 to the communication I/F 10-2. As illustrated in FIG. 11B, the transmission format includes "terminal status" representing the state of the terminal by ONL and ERR, a "control response" that is a response to a control command, and "state information" representing a state (event occurrence state, internal signal state, statistical information, or the like) of the terminal device 3-2A.

In the communication system 100A according to the comparative example, the two respective communication I/Fs 10-1 and 10-2 transmit data to the communication master 1 in the transmission formats illustrated in FIGS. 11A and 11B. Therefore, the Ethernet cable 6-1 is wired between the communication I/F 10-1 and the switch 2-1, and the Ethernet cable 6-2 is further wired between the communication I/F 10-2 and the switch 2-2. Accordingly, the switch 2-1 requires a number of ports greater than or equal to a number of terminal devices. On the other hand, it is desirable to have a larger number of terminal devices that can be connected to one switch 2-1 without increasing the number of switches 2-1 because of a need to reduce the cost of the communication system 100A and because of constraints space for providing the communication system 100A.

For example, in addition to the two CPUs illustrated in FIGS. 10A and 10B, a third CPU can be added to perform data integration processing and/or communication I/F processing can be improved to perform data integration in order to respond to such a need. Such an addition of a CPU or improvement of communication I/F processing is to extract necessary data from data received from the CPU 11-1 and the CPU 11-2, integrate the extracted data in a single transmission format, create data of "control response+state information+terminal status", and transmit the created data to the communication master 1.

However, the addition of a CPU is costly disadvantage. On the other hand, the improvement of communication interface processing requires improvement each time the data format of a CPU from which data is extracted is changed. Because the communication interface is a common component that is also used by other terminals, modification or improvement for a specific terminal is disadvantageous in terms of operation due to an increase in types of communication I/F to be managed.

With respect to the above, the terminal device 3 according to the present embodiment changes the transmission format for transmitting control responses and state information without adding a CPU or without improving the communication interface. That is, by the CPU 11-1 and the CPU 11-2 generating data considering the format of control information and state information after integration, the processing contents in the communication I/F can be made one. Note that as long as the CPU 11-1 and CPU 11-2 meet the format after integration, the number of terminal devices to be integrated is not limited in principle. Logical disjunction may be taken for a required number.

Also, according to the communication system 100 according to the present embodiment, in a case where the number of objects 4 to be controlled is the same, in comparison to the communication system 100A according to the comparative example, the number of Ethernet cables 6 between the switch 2 and the terminal devices 3 can be reduced, and by the reduction of Ethernet cables 6, the number of empty ports among a plurality of ports of the switch 2 can be increased. Further, by the increase of empty ports of the switch 2, because terminal devices 3 can be additionally connected to the empty ports of the switch 2, an increase of the switch 2 can be suppressed.

Accordingly, the cost associated with installing the switch 2 can be significantly reduced. Particularly, in railway vehicles (train cars), the space for installing devices other than passenger spaces is limited. Accordingly, by reducing the switch 2 and reducing the number of Ethernet cables 6, it is also possible to obtain an effect of effectively utilizing a device installation space of a railway vehicle.

The conventional art disclosed in Patent Document 1 uses logical disjunction to generate transmission data (to integrate each terminal status or the like). Therefore, for example, even when the integrated terminal status is "normal", it is impossible to determine whether or not all the terminal statuses before integration are "normal". That is, among all terminal statuses, even if one terminal status is "other", when the other terminal statuses are "normal", the terminal status after integration becomes "normal". Also, even when the integrated terminal status is "minor failure", the communication system disclosed in Patent Document 1 cannot determine whether or not "serious failure" is included in the terminal statuses before integration. That is, among all terminal statuses, even if one terminal status is "serious failure", when the other terminal statuses are "minor failure", the terminal status after integration becomes "minor failure". For example, with respect to a case where one system has two objects to be controlled, there may be a system that is available when either can function as in duplication, there may be a system that can provide limited service (boarding and exiting) when one can function as in double doors, and there may be a system that cannot function as a system unless both objects to be controlled are coupled and both function. In the communication system disclosed in Patent Document 1, even when the integrated terminal status is "normal" or "minor failure" as described above, there is a problem that it is impossible to determine whether or not "serious failure" or "other" (an object to be controlled does not function) is included in the respective terminal statuses.

In order to determine whether or not "serious failure" or "other" is included in such respective terminal statuses, the communication system 100 according to the present embodiment allocates a bit that is the same as a conventional ONL bit to another bit (a position common in all terminals) in the terminal status such that the bit is subject to logical conjunction. Then, after integrating the terminal statuses, the state of the terminal is determined by ONL and ERR, which are the result of conventional logical disjunction, and the bit, which is the result of new logical conjunction. According to the communication system 100 according to the present embodiment, in addition to the effect of being able to suppress an increase of an Ethernet switch, by adding logical disjunction to integration of terminal statuses, for which only logical disjunction was taken, in addition to the conventional "normal", "minor failure", "serious failure", and "other", it is also possible to obtain effects of being able to determine whether or not "other" is included in the terminal statuses when the integrated terminal status is "normal" and being able to determine whether or not "serious failure" or "other" is included in the terminal statuses when the integrated terminal status is "minor failure".

The configuration illustrated in the above described embodiment is an example of the subject matter of the present invention, and can also be combined with another known art. Also, part of the configuration can be omitted or changed without departing from the scope of the present invention.

What is claimed is:

1. A terminal device that is connected via a cable to a port of a switching device and performs data communication with a master device, the terminal device comprising:
   a plurality of controllers configured to control, in accordance with a control command transmitted from the master device, a plurality of devices to be controlled; and
   a data transmitter configured to integrate data, transmitted from the plurality of respective controllers, in a transmission format for transmitting data to the master device, by obtaining respective temporary data by exclusive logical disjunction of the respective data transmitted from the plurality of respective controllers with a predetermined logical conjunction pattern and taking logical disjunction of the obtained respective temporary data, to transmit the integrated data to the switching device.

2. The terminal device according to claim 1, wherein the data transmitter arranges the data, transmitted from the respective controllers, at positions not overlapping with each other in the transmission format.

3. A communication system comprising:
   the terminal device according to claim 1.

4. A communication method of a terminal device that is connected via a cable to a port of a switching device and performs data communication with a master device, the communication method comprising:
   integrating data, transmitted from a plurality of respective controllers that control a plurality of devices to be controlled in accordance with a control command transmitted from the master device, in a transmission format for transmitting data to the master device, by obtaining respective temporary data by exclusive logical disjunction of the respective data transmitted from the plurality of respective controllers with a predetermined logical conjunction pattern and taking logical disjunction of the obtained respective temporary data; and
   transmitting the integrated data to the switching device.

* * * * *